(12) United States Patent
Van Der Meer et al.

(10) Patent No.: US 6,454,131 B1
(45) Date of Patent: Sep. 24, 2002

(54) BEVERAGE DISPENSING APPARATUS

(75) Inventors: Sijtze Van Der Meer, Drachten; Sjoerd Timmermans, The Hague, both of (NL)

(73) Assignee: Heineken Technical Services B.V., Amsterdam (NL)

( * ) Notice: Subject to any disclaimer, the term of this patent is extended or adjusted under 35 U.S.C. 154(b) by 0 days.

(21) Appl. No.: 09/642,763

(22) Filed: Aug. 22, 2000

Related U.S. Application Data

(62) Division of application No. 09/143,832, filed on Aug. 31, 1998, now Pat. No. 6,182,863.

(51) Int. Cl.[7] .................................................. B67D 5/00
(52) U.S. Cl. .............................. 222/95; 222/94; 222/96; 222/105; 222/386.5; 222/389; 222/399
(58) Field of Search ............................ 222/94–96, 105, 222/386.5, 389, 394, 399

(56) References Cited

U.S. PATENT DOCUMENTS

| | | |
|---|---|---|
| 3,712,514 A | 1/1973 | LeBlanc |
| 4,162,030 A | 7/1979 | Capra et al. |
| 4,921,135 A | 5/1990 | Pleet |
| 5,240,144 A | 8/1993 | Feldman |
| 5,246,140 A | 9/1993 | Thix et al. |
| 5,251,787 A * | 10/1993 | Simson ........................ 222/95 |
| 5,492,249 A * | 2/1996 | Beach .......................... 222/96 |
| 5,607,084 A * | 3/1997 | George .................. 222/153.03 |
| 5,797,517 A | 8/1998 | Weinstein |

FOREIGN PATENT DOCUMENTS

| | | |
|---|---|---|
| WO | WO 90/11963 | 10/1990 |
| WO | WO 95/20540 | 8/1995 |

* cited by examiner

Primary Examiner—J. Casimer Jacyna
(74) Attorney, Agent, or Firm—Young & Thompson

(57) ABSTRACT

A beverage dispensing apparatus is provided which includes a housing (1) having a chamber (3) in which a beverage container (5) can be placed, the container having at least one deformable wall (16) and an outlet (8) to which a beverage delivery line (7, 34) and a tapping device (6) can be connected, a locking and sealing mechanism (10, 12, 13) for closing a pressure space (17) in an airtight manner, which pressure space is situated between an outer wall (16) of the beverage container (5) and an inner wall (15) of the chamber (3), and a pressurizing device (16) for pressurizing the pressure space (17) to force beverage out of the container via the outlet. To improve the sealing and locking and to make the apparatus convenient to operate for the user the locking and sealing mechanism (10, 12, 13) is arranged between the outer wall (16) of the beverage container and a wall of the chamber. As a result of this, the pressure chamber is disposed between the inner wall (16) of the chamber and the outer wall (15) of the container, the outlet (8) of the container (5) being situated outside the pressure space (17).

12 Claims, 8 Drawing Sheets

BEVERAGE DISPENSING APPARATUS

CROSS-REFERENCE TO RELATED APPLICATIONS

This application is a division of application Ser. No. 09/143,832, filed Aug. 31, 1998, now U.S. Pat. No. 6,182,863.

BACKGROUND OF THE INVENTION

The invention relates to a beverage dispensing apparatus comprising a housing having a chamber formed with an opening through which a beverage container can be placed into the chamber, which container has at least one deformable wall portion and has an outlet to which a beverage delivery line to a tapping device can be connected, a cover for closing the opening of the chamber, locking and sealing means for closing the chamber in an airtight manner so as to form a pressure space situated between the deformable wall portion of the beverage container and an inner wall of the chamber, and pressurizing means for pressurizing the pressure space to force beverage out of the container via the outlet.

Such an apparatus is known from WO-A-95/20540 and is intended for dispensing aerated or non-aerated beverages, particularly beer. In this known apparatus a flexible bag containing a beverage is accommodated in a chamber of a vessel, after which the chamber is hermetically sealed by means of a cover. The space between the chamber and the bag is pressurized. A flexible hose connects an outlet of the bag to a beverage delivery tap. To this end, the hose is passed through an opening in the cover. A drawback of this construction is that the hose in this opening should be sealed very effectively because the hose is situated, at least partly, in the pressure space.

SUMMARY OF THE INVENTION

It is an object of the invention to improve a beverage dispensing apparatus of the type defined in the opening paragraph, in such a manner that the afore-mentioned drawback is avoided and, in addition, the apparatus becomes user-friendly.

To this end, the beverage dispensing apparatus is characterized in that the locking and sealing means are arranged between the beverage container and the chamber so as to form the pressure space between an inner wall of the chamber and at least the deformable wall portion of the container, the outlet of the container being situated outside the pressure space. Now the pressure space is no longer bounded by the cover. The line or hose coupled to the outlet is now situated wholly outside the pressure space. The sealing problem as mentioned hereinbefore for the apparatus in accordance with WO-A-95/20540 does not occur any longer. An additional advantage is that owing to the position of the locking and sealing means it is now possible in a simple manner to automatically create a pressure space when the beverage container is introduced into the chamber of the housing. Operation becomes easier for the user.

A preferred embodiment of the apparatus is characterized in that the locking means comprise spring-loaded locking slides which cooperate with a flange of the container to lock the container in the chamber. When a beverage container is introduced into the chamber the outer wall of the container pushes the locking slides back against the force of spring until a flange of the container has moved past the locking slides, after which the locking slides spring back and lock the container.

An embodiment including a variant of the aforementioned locking means is characterized in that an edge of the opening of the chamber has been provided with an annular part on which the locking slides are mounted so as to be resiliently movable in radial directions.

A preferred embodiment is characterized in that the apparatus includes an annular collar mounted onto a neck with the outlet opening of the container, the collar having a flange for cooperation with the locking slides to lock the container in the chamber. Such a collar can be fixedly connected to the container or can be constructed as a separate removable part. The sealing means are constituted by sealing rings between the inner wall of the chamber and an outer flange of the collar and, in the case of a separate removable collar, an additional sealing ring between the neck of the container and an inner flange of the collar.

The apparatus further comprises an unlocking mechanism for unlocking the container. Further details of this are given in the description of an embodiment with reference to the Figures.

A further embodiment of the apparatus is characterized in that the pressurizing means include a pump which can be turned on and turned off by means of a switch which can be actuated by means of the cover. The apparatus further has a pressure-relief valve for the pressure space, which valve can be actuated by means of the cover. When the cover is closed the pressure-relief valve is closed and the pump is started. When the cover is opened the pump stops and the pressure-relief valve for the pressure space is opened, after which the beverage container can be removed from the chamber after this container has been unlocked.

For reasons of hygiene the outlet of a new container filled with a beverage is closed by means of a pierceable sealing membrane. For perforating the membrane the container comprises a piercing mechanism which is connected to a beverage delivery hose and which automatically pierces the sealing diaphragm as soon as the pressure space is pressurized for the first time. For this purpose, the apparatus is characterized in that, when a beverage container is disposed in the chamber and locked, there is some distance between the flange of the container and the locking slides, which enables the container to be moved upward over said distance when the pressure space is pressurized and thus to pierce the membrane. A construction by means of which a sealing membrane can be pierced is known per se from WO-A-95/20540. However, in said construction piercing must be effected by hand.

In yet another preferred embodiment the tapping device comprises two parts, of which a lower part is fixedly connected to the housing and of which an upper part is hingeable relative to the lower part, the beverage delivery line being partly formed by a flexible hose which can be clamped between the upper and the lower part, which upper part has an actuating handle and which lower part has a shut-off mechanism which in conjunction with the actuating handle can open or can pinch off the beverage delivery hose. This results in a mechanism, which is simple to operate by the user, for installing the beverage delivery hose to the location where the beverage is to be tapped. After the beverage delivery hose has been coupled to the lower part the upper part is secured to the lower part, the hose being clamped in place and at the same time being pinched off. When the actuating handle is opened the hose is no longer pinched and the beverage flows out through the hose under the influence of the pressure in the pressure space.

The apparatus further has a number of safety features to preclude the undesired turn-on of the pressure and the undesirable discharge of beverage.

Owing to the constructional measures that have been taken the operation of the apparatus is very user friendly as well as safe.

BRIEF DESCRIPTION OF THE DRAWINGS

The invention will now be described in more detail, by way of example, with reference to an embodiment shown in the drawings. In the drawings.

DESCRIPTION OF THE PREFERRED EMBODIMENTS

Figure 1:
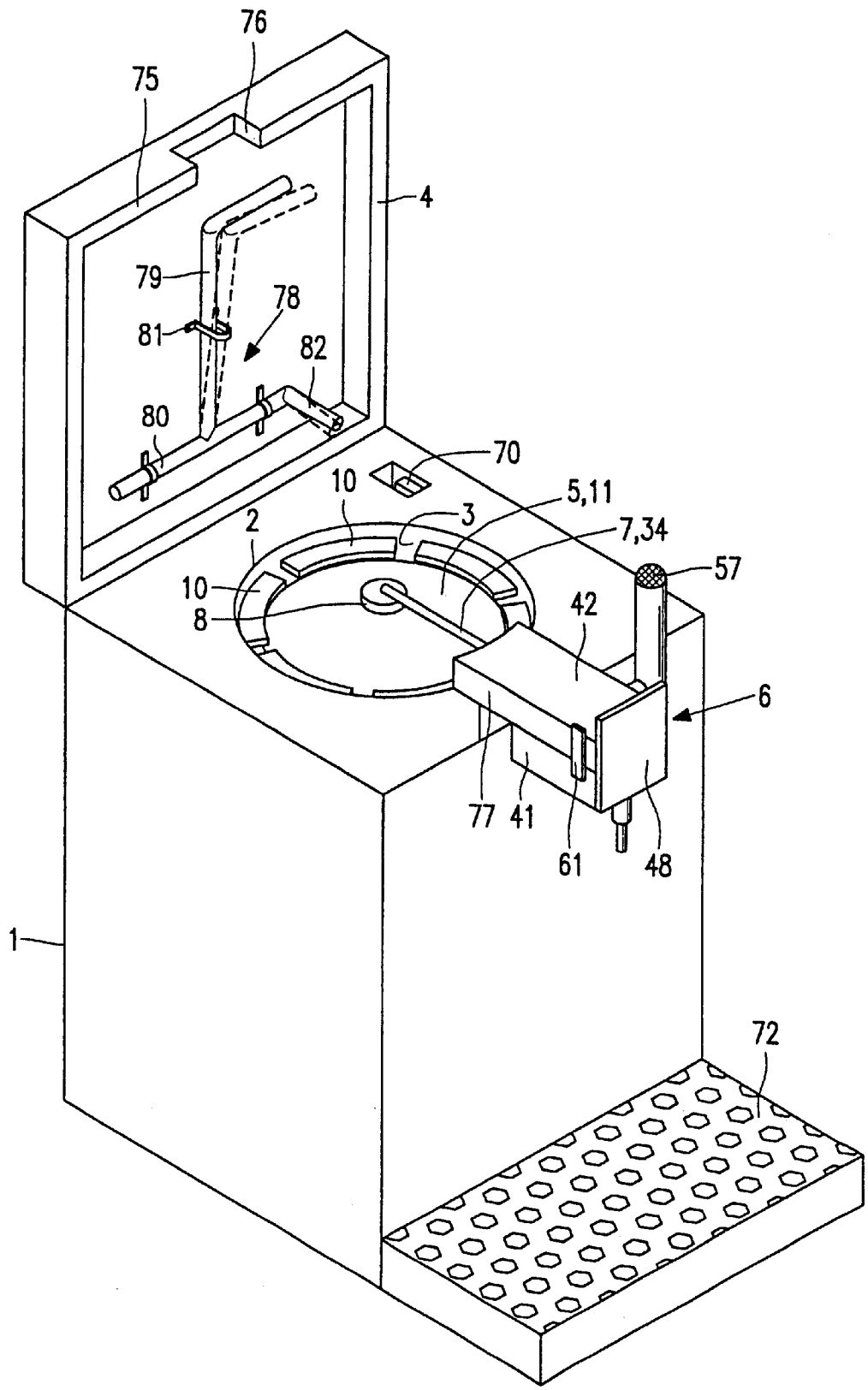
FIG. 1 is a diagrammatic perspective view of a beverage dispensing apparatus in accordance with the invention.

The beverage dispensing apparatus shown in FIG. 1 comprises a housing 1 having an opening 2 which gives access to a chamber 3. A cover 4 is hingeably connected to the housing 1 to open and close the chamber. Through the opening 2 a beverage container, for example a beer container, can be placed into the chamber 3. The housing further carries a tapping device 6. A beverage delivery line 7 has one end connected to an outlet 8 of the beverage container and the other end to the tapping device 6.

Figure 2:
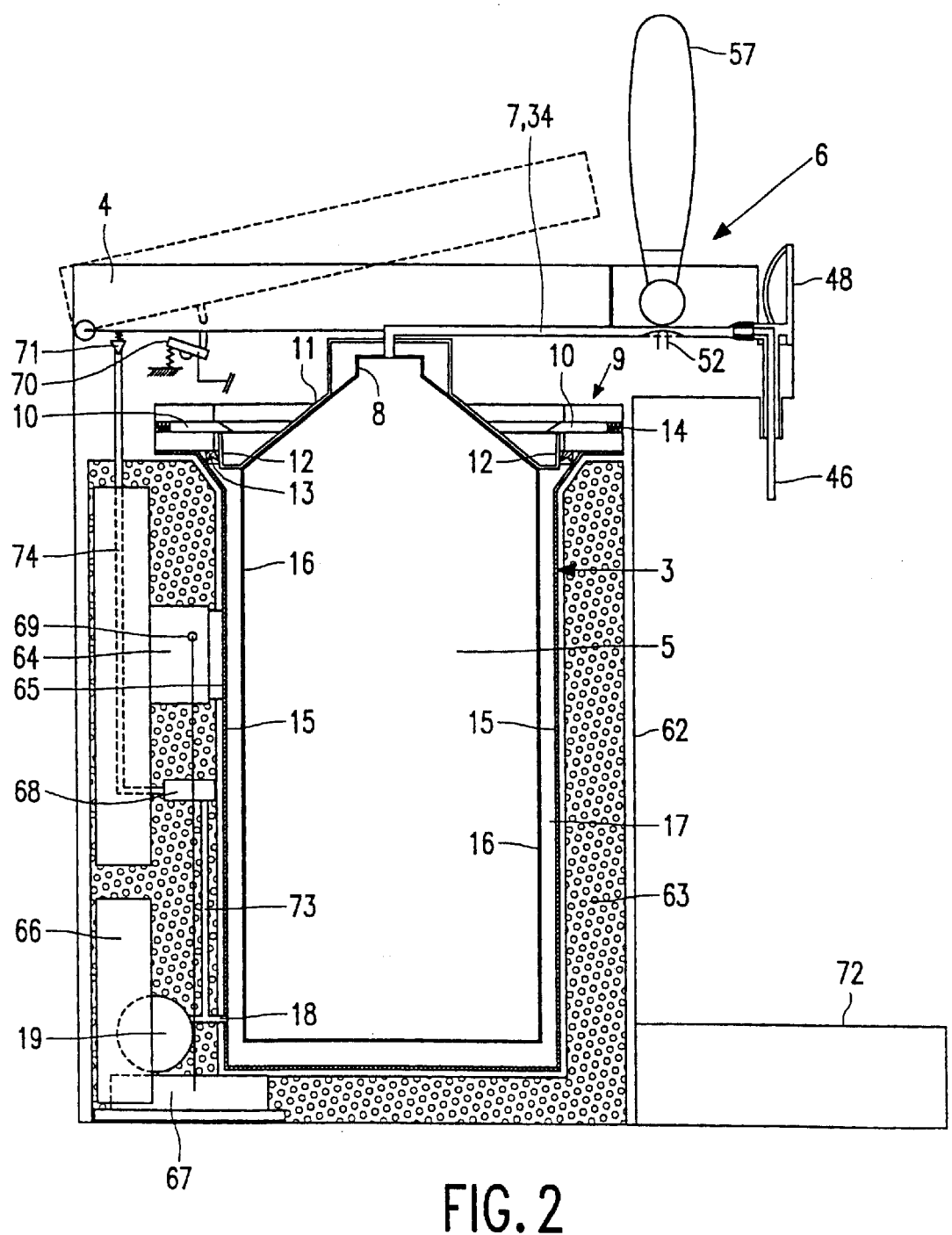
FIG. 2 is a diagrammatic cross-sectional view of the apparatus shown in FIG. 1.

FIG. 2 is a diagrammatic representation of the beverage dispensing apparatus in which a beverage container 5 has been placed. An annular part 9, mounted on the upper rim of the housing 1 around the opening 2, carries locking and sealing means for the beverage container 5. The locking means for locking the beverage container in the chamber 3 comprises a plurality of spring-loaded locking slides 10 which are movable in radial directions. The beverage container has a collar 11, which is fixedly connected to a wall of the container and which has a flange 12 for cooperation with the locking slides 10. A sealing ring 13 is attached to the annular part 9 for the purpose of sealing the container in the chamber. When a beverage container is placed into the chamber the locking slides 10 are urged outward against the force of the springs 14 by the flange of the container. After the flange has moved past the slides the slides move radially inward again under the spring load, thereby locking the container in the chamber. The sealing ring 13 then lies against the inner wall 15 of the chamber as well as against the flange 12 of the container (see also FIG. 3). By means of this sealing an air-tight space 17 is formed between the inner wall 15 of the chamber and the outer wall 16 of the container. This space 17 is connected to a pump 19 by means of a line 18. The pressure in the space 17 can be raised by means of the pump. The pressure medium is preferably air. Raising the pressure in this pressure space causes an external pressure to be exerted on the deformable wall 16 of the beverage container and, consequently, on the beverage. When a tap of the tapping device 6 is now opened, the beverage is forced out through the beverage delivery hose and can be collected in a glass or cup.

Figure 3:
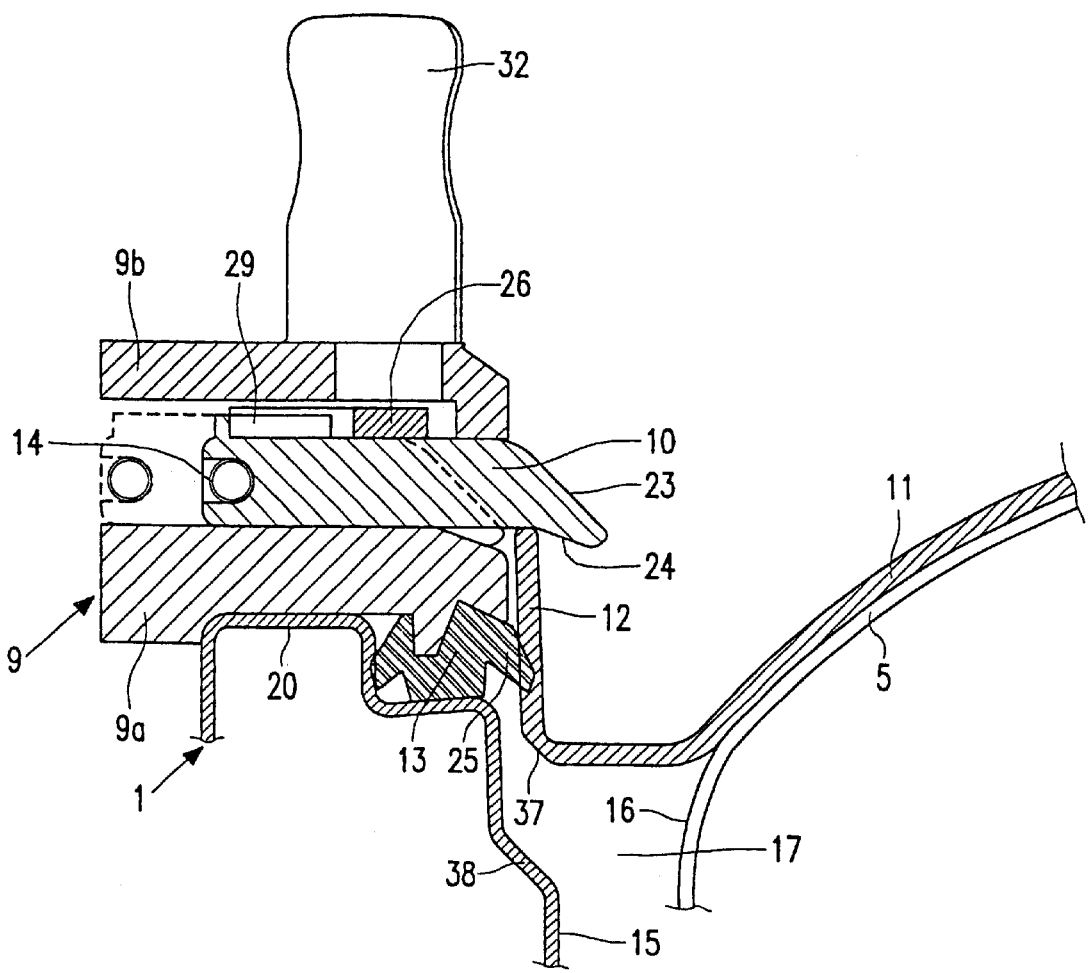
FIG. 3 shows the locking mechanism and the sealing means of the beverage container in the apparatus in a cross-sectional view taken on the line III—III in FIG. 4.
Figure 4:
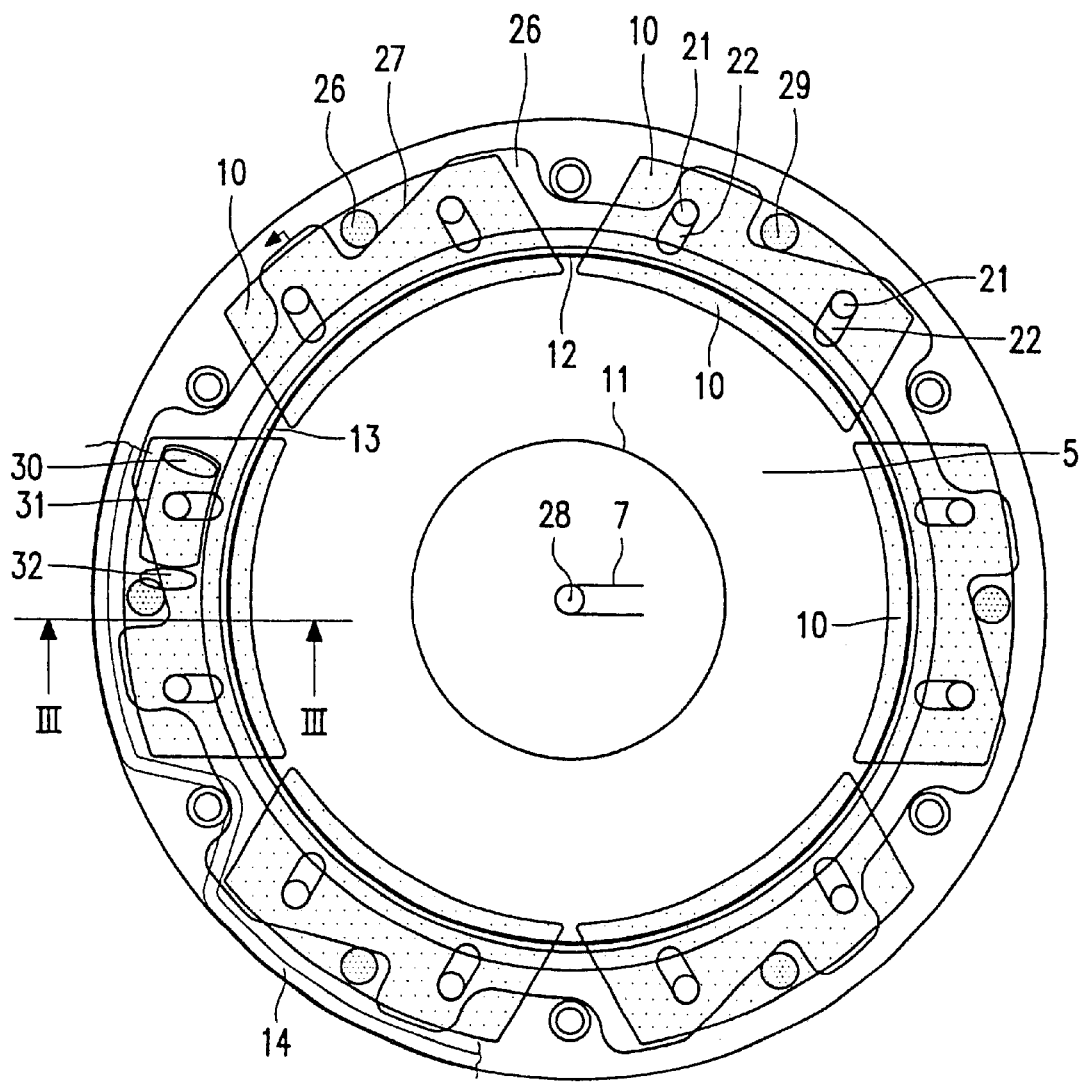
FIG. 4 shows the locking and unlocking mechanism for the beverage container.

The sealing and locking (as well as unlocking) will now be described in more detail with reference to the detailed drawings in FIGS. 3 and 4. The annular part 9 with the locking mechanism and the seal is mounted on the upper rim 20 of the housing 1. This annular part 9 comprises a lower ring 9a and, spaced therefrom, an upper ring 9b, between which the locking slides 10 are disposed. For this purpose, the lower ring 9a carries pins 21, which engage in openings 22 of the locking slides (FIG. 4). The locking slides are pulled inward by the force of a helical spring 14. The inner ends of the locking slides are nose-shaped in such a manner that both an upper surface 23 and a lower surface 24 thereof slope downward in radially inward directions. During placement of the container into the chamber the oblique upper surface 23 assists in urging away the slides 10 by means of the flange 12 of the collar 11 of the container 5. The bevel 37 of the flange also contributes to this. The sealing ring 13 is clamped between a part of the upper rim 20 of the housing and the lower ring 9a. The sealing ring has an inwardly directed flexible lip 25, which also has a downward slope. The flexible sealing lip is in sealing engagement with the flange 12 of the container disposed in the chamber. The pressure space 17 can be pressurized by means of the pump 19. Preferably, air is used for this purpose. The air pressure ensures that the sealing lip 25 is pressed even more firmly against the flange and the pressure space 17 is sealed even more effectively. The pressure in the pressure space exerts a force on the container, which consequently tends to move upward. The locking slides 10 prevent the container 5 from moving upward.

If an empty container is to be removed from the chamber, the pressure in the pressure space should first be relieved. Once this has happened the locking slides 10 can be pushed back against the force of the spring 14, i.e. pushed or pulled outward. For this purpose, there has been provided an unlocking mechanism formed by an unlocking ring 26 having oblique cam surfaces 27. The ring 26 is rotatable about the axis 28. The locking slides 10 have each been provided with an unlocking pin 29, which unlocking pins cooperate with the oblique surfaces 27 of the unlocking ring 26. To rotate the unlocking ring this ring has a small handle 30, which projects through an opening 31 in the upper ring 9b (the upper ring 9b is not shown in FIG. 4). The upper ring also has another small handle 32. By urging the two handles 30 and 32 towards one another the unlocking ring 26 is rotated counter-clockwise. As a result of this, the oblique cam surfaces 27 urge the unlocking pins 29 and, as a consequence, the locking slides 10 outward, so that the flange 12 is no longer locked and an empty container 5 can be removed. Removing a container from the chamber is not possible when the pressure space 17 is still under pressure. As long as the space 17 is under pressure the flange 12 is urged against the inclined lower surfaces 24 of the slides 10. Pushing back the slides 10 is made virtually impossible by the inclined lower surfaces 24.

Figure 5:
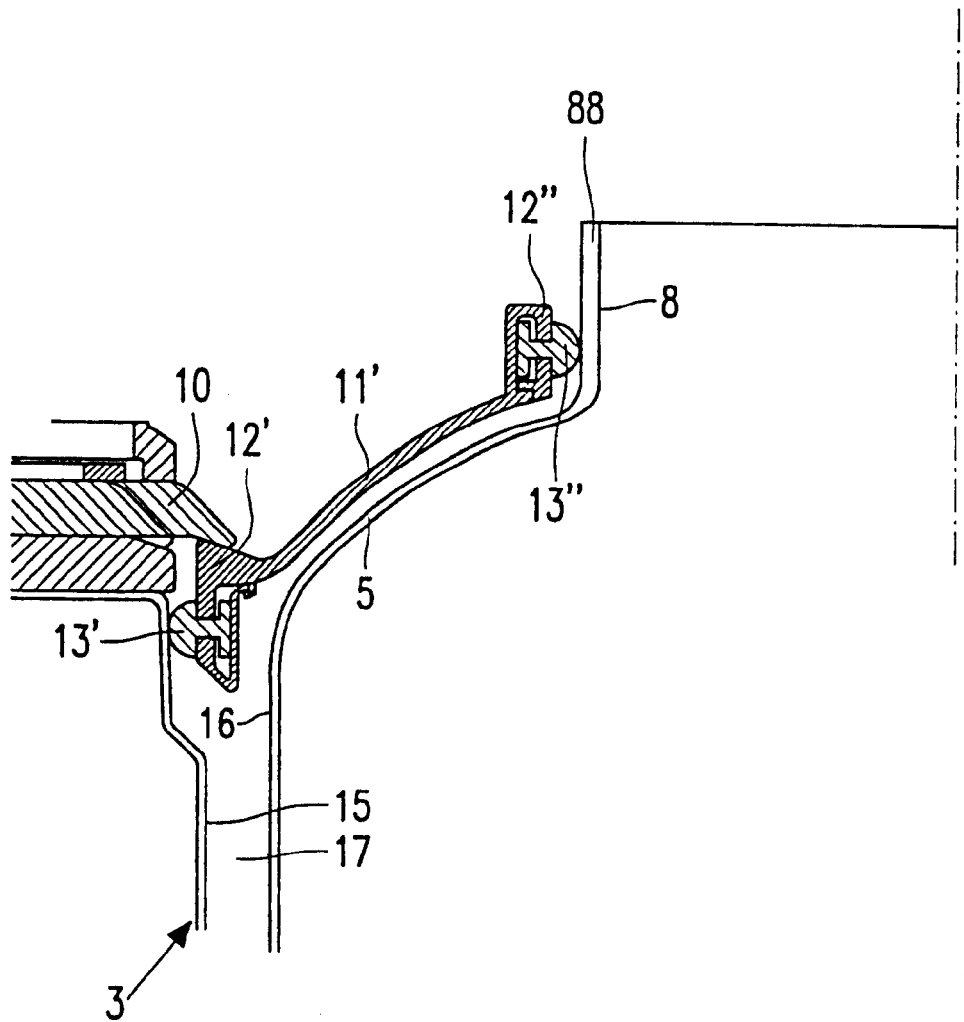
FIG. 5 is a cross-sectional view of the locking mechanism and the sealing means of the beverage container of the apparatus in another embodiment than that shown in FIG. 3.

Instead of a collar 11 which is fixedly connected to the wall of the container it is possible to use a "separate removable collar", as is shown in FIG. 5. After a container 5 has been placed into chamber 3 of the apparatus a collar 11' is placed onto the neck 88 with the outlet opening 8 of the container. An outer flange 12' has been provided with a selling ring 13' for sealing with respect to the inner wall 15 of the chamber 3, while an inner flange 12" has been provided with a sealing ring 13" for sealing with respect to the neck 88 of the container. In the same way as in the example of FIG. 3, the flange 12' cooperates with the locking slides 10 for locking the container in the chamber of the apparatus.

Figure 6:
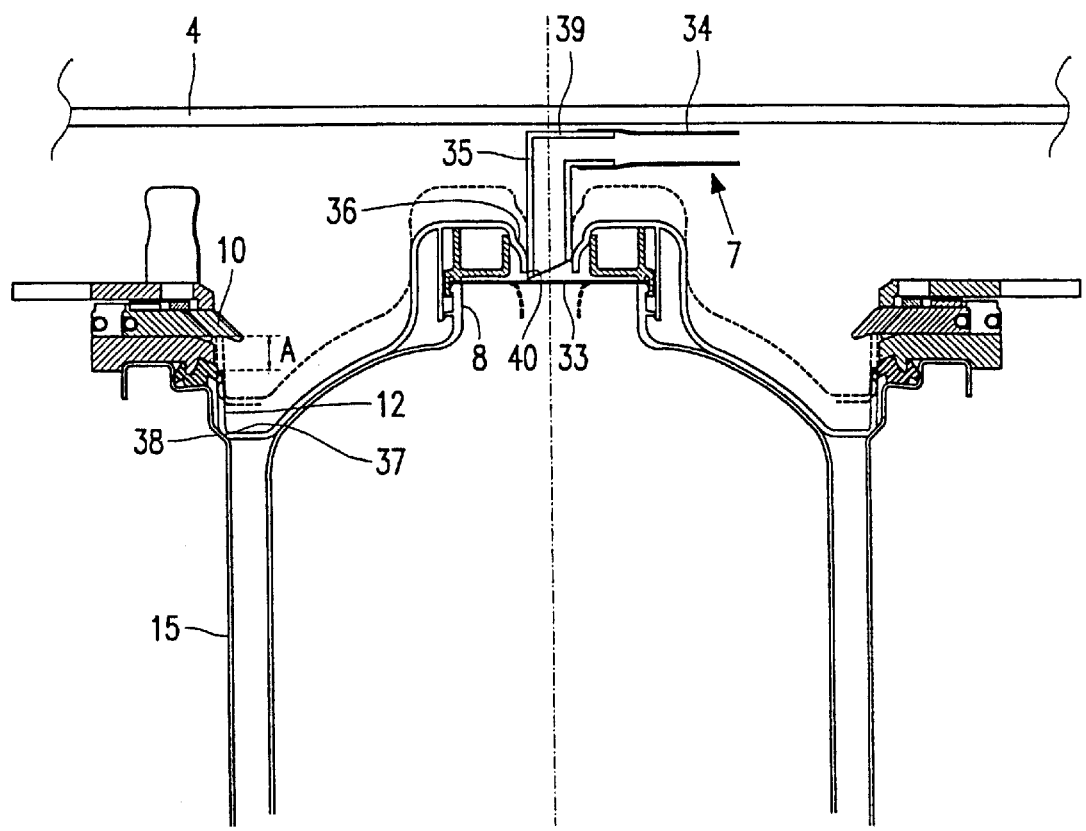
FIG. 6 is a cross-sectional view of the apparatus to illustrate the piercing of the sealing membrane of the beverage container.

For reasons of hygiene the beverage container is sealed hermetically until it is put into use. For this purpose, a sealing membrane 33 is arranged over the outlet opening 8 and is attached to the edge of the opening (see FIG. 6). The beverage delivery line 7 is formed by a hose 34 having a right-angled inlet pipe 35 at its inlet end. This inlet pipe extends into a union 36 of the collar to a location just above the membrane 33. When the container 5 is placed into the chamber 3 the lower surface 37 of the flange 12 bears on an edge portion 38 of the inner wall 15 of the chamber. The upper surface of the flange 12 is situated at a distance A beneath the locking slide 10. When the cover 4 is closed the upper end 39 of the right-angled inlet pipe is disposed just underneath the closed cover 4. After the pump 19 has been started air is pumped into the pressure space 17 and the pressure rises gradually. As a result, the container 5 moves slowly upward until the flange 12 abuts against the locking slide 10. During this upward movement the end 40 of the inlet pipe 35 pierces the membrane 33, as a result of which the beverage is forced out of the container into the hose 34 towards the tapping device 6.

Figure 7:
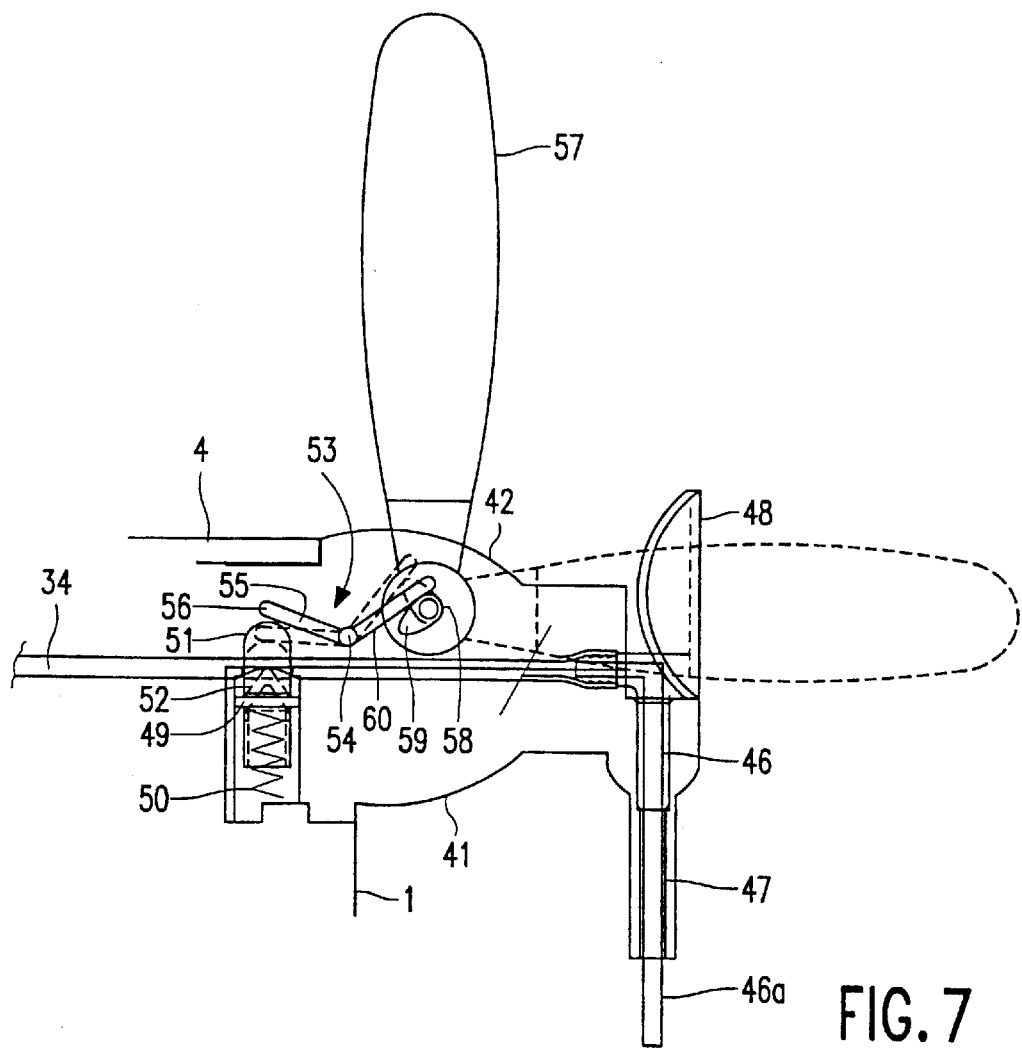
FIG. 7 is a side view of the tapping device.
Figure 8:
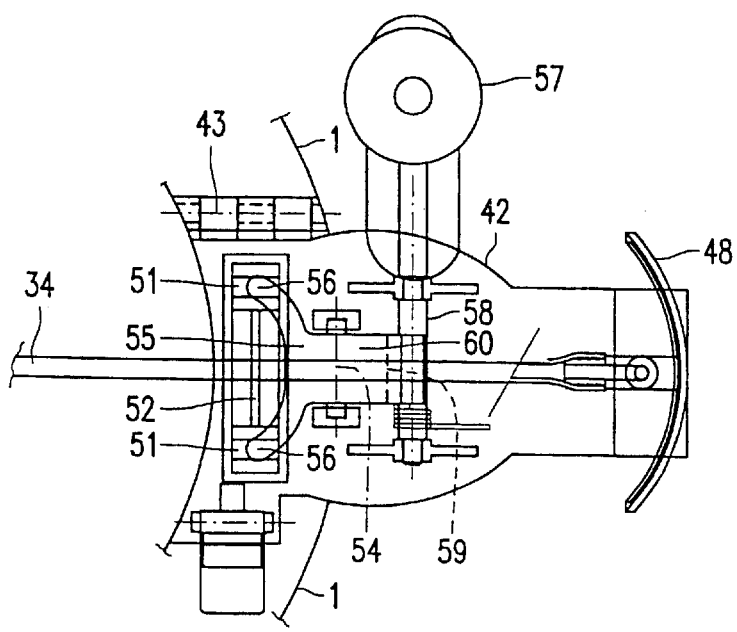
FIG. 8 is a plan view of the tapping device.
Figure 10:
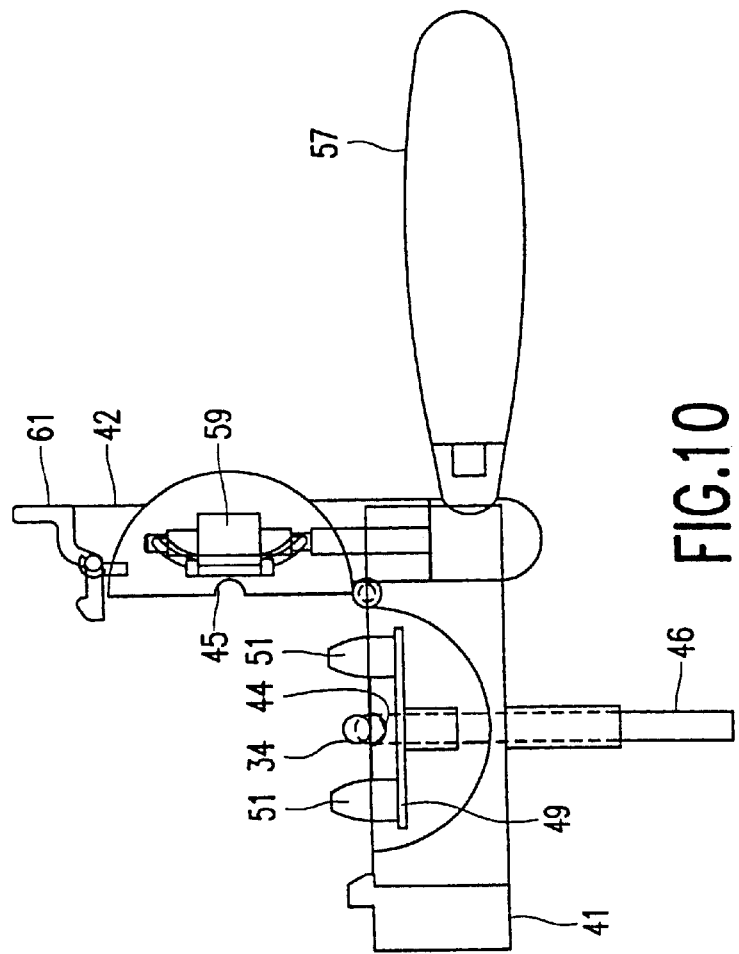
FIG. 10 is a front view of an opened tapping device of FIG. 9.
Figure 9:
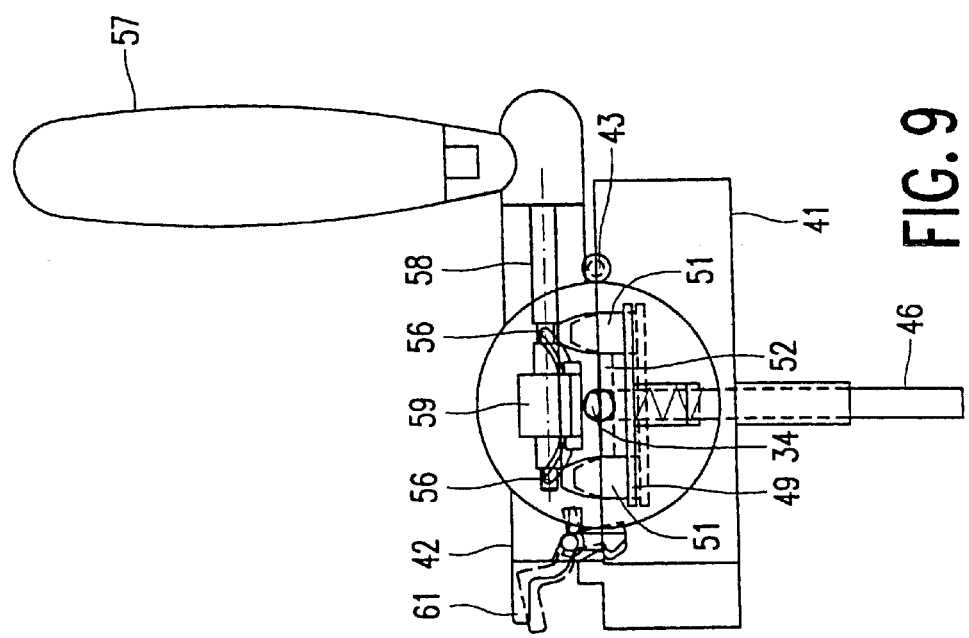
FIG. 9 is a front view of the tapping device.

The tapping device 6 is shown in detail in FIGS. 7–10. The tapping device comprises a lower part 41, which is fixedly connected to the housing 1, and an upper part 42, which is hingeably connected to the lower part by means of a hinge 43 (FIGS. 8 and 10). Both parts have a groove 44 and 45, respectively (FIG. 10), in which the beverage delivery hose 34 can be arranged. The outlet end of the hose has a right-angled outlet pipe 46. The lower part of the tapping device has a vertical channel 47 through which the outlet pipe can be passed. For reasons of hygiene the end portion 46a of the outlet pipe projects fully from the channel 47, so that the beverage cannot come into contact with the lower part 41 of the tapping device. For a convenient operation the outlet pipe 46 has a handle 48 which may bear an indication of the kind of beverage. The tapping device further comprises a shut-off mechanism by means of which the flexible hose can be pinched off or opened. This shut-off mechanism comprises a clamping block 48, which is vertically movable against the force of a spring 50. The clamping block has two upright pressure pins 51 between which a hose clamp 52 formed by a V-shaped pressure member is interposed. The hose 34 extends over this V-shaped pressure member. The shut-off mechanism further comprises a lever 53, which is situated in the upper part 42 of the tapping device and which is pivotable about a pivot 54.

At one side of the pivot this lever has a forked arm 55 whose ends 56 cooperate with the pressure pins 51 of the clamping block 49. At the other side of the pivot 54 the lever 53 has an arm 60. The upper part 42 of the tapping device comprises an actuation handle or tap 57, which is pivotable about a tap spindle 58. The tap spindle 58 carries an eccentric cam 59, which cooperates with the arm 60 of the lever. FIG. 7 shows in solid lines the situation in which the ends 56 of the forked arms 55 are just clear of the pressure pins 51, so that the spring 50 urges the clamping block 49 upward as far as possible and the hose 34 is pinched off completely by the hose clamp 52. When the tap 57 is turned clockwise the eccentric cam 59 is pressed against the arm 60 and the lever 53 is pivoted counter-clockwise. The ends 56 of the arm 55 press the pressure pins 51 and, consequently, the hose downward. As a result of this, the hose 34 is opened and the beverage can flow through the hose to the outlet pipe 46. When the tap is swung back the hose is pinched off immediately and the outflow ceases. The upper part 42 of the tapping device can be locked to the lower part 41 by means of a locking mechanism 61.

The housing 1 of the apparatus is double-walled, a thermally insulating material 63 being interposed between the outer wall 62 and the inner wall 15, which forms the wall of the chamber 3 (FIG. 2). The housing 1 further accommodates the following parts:

- a cooling device 64, for example a Peltier element for cooling the container 5. The cooling device has a cooling surface 65, which is in direct thermally conductive contact with the inner wall 15 of the chamber,
- the afore-mentioned pump 19,
- a cooling fan 66 for cooling the heatsink of the cooling device and other electrical parts, such as a printed circuit board 67,
- a pressure controller for controlling the pressure in the pressure space 17,
- a temperature controller 69 for controlling the temperature of the cooling device,
- a pump switch 70 for turning on and turning off the pump 19, and
- a pressure-relief valve 71 for relieving the pressure in the pressure space 17. The apparatus further has a drip-tray for collecting spilled beverage.

The operation of both the pump switch 70 and the pressure-relief valve 71 is linked to the opening and closing of the cover 4 on the housing 1. A line 73 connects the pressure controller 68 to the line 18 between the pump 19 and the pressure space 17. A line 74 extends from the pressure controller 68 to the pressure-relief valve 71. As soon as the cover 4 is opened the pressure-relief valve is opened and the pressure space 17 is put into communication with the exterior (atmosphere) via the lines 18, 73 and 74. The pressure in the pressure space is relieved. The pump switch 70 turns off the pump 19 as soon as the cover 4 is opened and turns on the pump when the cover is closed.

As already stated, the upper part 42 of the tapping device 6 is hingeably connected to the lower part 41 and can be locked to this lower part by means of the locking mechanism 61. When the beverage dispensing apparatus is in use, i.e. when beverage can be dispensed, it is not allowed to swing the upper part 42 away from the lower part 41 because otherwise the beverage delivery hose 34 is no longer pinched off and beverage could flow out. Swinging up the upper part is precluded in that an edge 75 of the cover 4 lies over the upper part in the closed condition. The edge 75 has a recess 76, which engages over the upper part (see FIG. 1). The upper part 42 cannot be swung up until the cover has been opened, after unlocking. Conversely, the cover 4 cannot be closed when the upper part 42 has not been swung down onto the lower part 41. This is precluded in that a side wall 77 of the upper part in the swung-up position abuts against the edge 75 of the cover.

Another safety measure is that when no beverage container 5 having a beverage delivery line 7 has been placed into the apparatus the pump switch 70 is not actuated. To this end, a detection mechanism 78 for detecting the presence of a container is arranged on the inner side of the cover 4. This mechanism comprises an L-shaped detection rod 79. A spindle 80 is mounted transversely to this rod 79. This spindle is rotatably mounted in the cover .4. The detection rod 79 can perform a small pivotal movement about the spindle 80. For this purpose, a bracket 81 extends over the detection rod 79 with ample clearance and is secured to the inner side of the cover 4. The clearance between the bracket and the detection rod limits the pivotal movement of the rod. The end of the spindle 80 carries an actuating pin 82. This actuating pin actuates the pump switch 70. When a container 5 having a beverage delivery line 7 is present in the apparatus and the cover is closed, the short arm of the detection rod 79 abuts against the beverage delivery line 7, as a result of which rotation of the spindle is inhibited and the actuating pin 82 acts upon the pump switch 70 and the pump is turned on. However, when no container with a beverage delivery line or a container without a beverage delivery line has been placed into the apparatus, the spindle 80 with the detection rod 79 can swing down, as a result of which the actuating pin 81 does not act upon the pump switch 69 and this switch is not actuated.

The beverage. dispensing apparatus is operated as follows. It is assumed that no container is present in the apparatus. The cover 4 is opened and a container filled with beverage is placed into the chamber 3. The locking slides 10 are then urged aside. When the container has been lowered completely into the chamber the slides 10 move inward again and lock the container. The upper part 42 of the tapping device 6 is swung up and the hose 34 is placed onto the lower part 41 over the hose clamp 52, and the outlet pipe 46 is inserted into the channel 47 of the tapping device. The upper part 42 is swung down onto the lower part and is locked thereto by means of the locking mechanism 61. The hose 34 is now pinched off. The cover can be closed and the pump switch 69 is automatically switched on. Moreover, the cooling device 64 and the cooling fan 66 are turned on. The pressure space 17 is gradually pressurized, as a result of which the container 5 moves upward. The sealing membrane is pierced and the beverage is forced into the beverage delivery line (hose). The beverage can be tapped after the tap 57 has been opened. When all the beverage has been drawn from the container and is empty the cover is opened. The pump switch immediately turns off the pump and the pressure-relief valve 71 is opened, as a result of which the pressure in the pressure space 17 drops out. By means of the handles 30, 31 the locking slides 10 can be released and the empty container can be removed from the apparatus.

The embodiment described herein uses air as a pressure medium for pressurizing the container. It is alternatively possible to use, for example, a liquid pressure medium. Furthermore, the described flange 12 of the container is mounted on a collar 11 which is fixedly connected to the container. Obviously, such a flange may directly form part of the wall of the container, i.e. may be integral therewith. In the present example sealing by means of the sealing ring 13 is effected on the flange 12. However, sealing is also possible directly on the wall of the container itself. Instead of a beverage container in the form of a bottle having compressible walls it is also possible to use other types of beverage containers in the apparatus in accordance with the invention, provided that they have at least one flexible deformable wall. For this, a kind of membrane-like wall might be considered. Such beverage containers are described in more detail in two Provisional Applications No. 60/057,616 and 60/057,814 filed at the same date by Heineken Technical Services B.V., which are herewith incorporated by reference.

What is claimed is:

1. Beverage dispensing assembly, comprising an outer housing (1) having a top opening for receiving a container (5), a tapping device (6) at an axial distance from a longitudinal center line of the housing, the tapping device comprising a handle (57) and an actuating mechanism for opening and closing an outflow end of a flexible tube (34), and pressure means (19) which can be placed in fluid connection with the container placed in the housing, the container (5) comprising a $CO_2$-containing beverage and having a deformable wall part which is compressible by the pressure means (19), an outlet closure (8) at a top part of the container (5) on or near a longitudinal center line of the container (5) and said flexible tube (34) being connectable to the outlet closure (8) for dispensing beverage from the container (5) upon deformation of the flexible wall part by the pressure means (19), said flexible tube (34) extending substantially transversely to the longitudinal center line of the container, beyond a perimeter of the container and having a length corresponding with said axial distance, said flexible tube (34) comprising at said outflow end positioning means (46, 46a, 48) for releasably engaging with the tapping device (6) such that said tube extends via a straight line path.

2. Beverage dispensing assembly according to claim 1, the positioning means comprising a handle (48).

3. Beverage dispensing assembly according to claim 2, the handle (48) comprising visual indicia.

4. Beverage dispensing assembly according to claim 1, the tube (34) being no longer than two times the diameter of the container (5).

5. Beverage dispensing assembly according to claim 1, wherein the outflow end (46, 46a) of the tube extends generally in the direction of the longitudinal center line of the container (5).

6. Beverage dispensing assembly according to claim 1, the outer housing comprising a lid for covering of the top opening, wherein said actuating mechanism comprises two parts (41, 42) which are hingeably connected and which define a channel (47) for receiving the tube (34), one of the parts (41, 42) comprising said handle (57) and engagement means (51, 52, 53) connected with said handle (57) for engaging a portion of said tube located in the channel (47) for opening and closing said tube portion, the two parts (41, 42) being operable independently from the lid position.

7. Beverage dispensing apparatus comprising an outer housing (1) having a top opening for receiving a container, a tapping device (6) at an axial distance from a longitudinal center line of the housing, the tapping device comprising a handle (57), actuating means for opening and closing an outflow part of a tube (34) and pressure means (19) which can be placed in fluid connection with a said container placed in the housing, the outer housing comprising a lid for covering of the top opening, wherein said actuating means comprises two parts (41, 42) which are hingeably connected and which define a channel (47) for receiving said tube (34), one of the parts (41, 42) comprising said handle (57) and engagement means (51, 52, 53) connected with said handle (57) for engaging a tube outflow part located in the channel (47) for opening and closing said outflow part, the two parts (41, 42) being operable independently from the lid position.

8. Container (5) for use with the tapping device according to claim 1, the container comprising a $CO_2$-containing beverage and having a deformable wall part which is compressible by the pressure means (19), an outlet closure (8) at a top part of the container on or near a longitudinal center line of the container having a closure and a flexible tube (34) connectable to the outlet closure (8) for, after opening of the outlet closure, dispensing the $CO_2$-containing beverage from the container (5) upon deformation of the flexible wall part by the pressure means (19), which tube (34) extends substantially transversely to the longitudinal center line of the container, beyond a perimeter of the container and has a length corresponding with said axial distance, the tube comprising at an outflow end a positioning device (46, 46a, 48) for releasably engaging with the tapping device (6) such that the tube extends via straight line path.

9. Container (5) according to claim 8, the positioning device comprising a handle (48).

10. Container according to claim 9, the handle comprising visual indicia.

11. Container according to claim 8, the tube (34) being no longer than two times the diameter of the container (5).

12. Container according to claim 8, wherein the outflow end (46, 46a) of the tube extends generally in the direction of the longitudinal center line of the container (5).

* * * * *